Dec. 9, 1969  J. K. BATES, JR  3,483,467
SYSTEM FOR DETERMINING THE TRANSFER FUNCTION OF AN ELECTRICAL
APPARATUS INCLUDING SIGNAL AMPLITUDE
TO PULSE WIDTH CONVERSION MEANS
Filed June 22, 1967
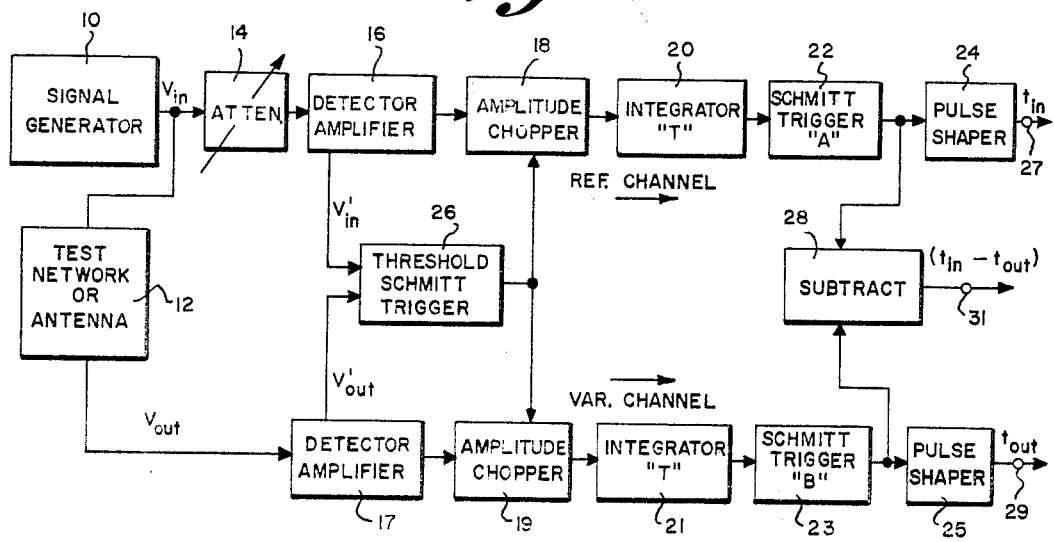
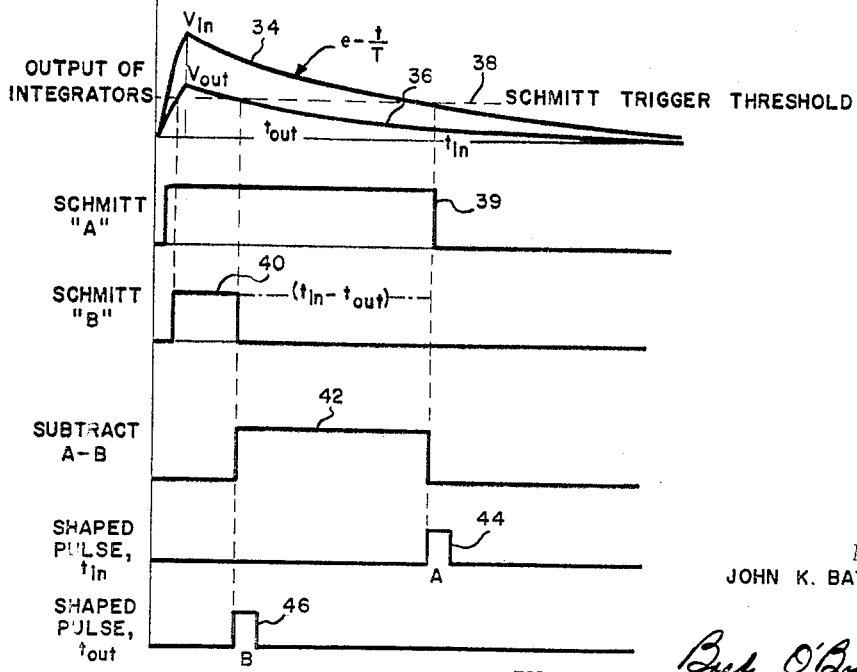
INVENTOR
JOHN K. BATES, JR.

United States Patent Office 3,483,467
Patented Dec. 9, 1969

3,483,467
SYSTEM FOR DETERMINING THE TRANSFER
FUNCTION OF AN ELECTRICAL APPARATUS
INCLUDING SIGNAL AMPLITUDE TO PULSE
WIDTH CONVERSION MEANS
John K. Bates, Jr., Endicott, N.Y., assignor to HRB-
Singer, Inc., State College, Pa., a corporation of
Delaware
Filed June 22, 1967, Ser. No. 647,986
Int. Cl. G01r 27/00, 7/00, 11/00
U.S. Cl. 324—57
10 Claims

ABSTRACT OF THE DISCLOSURE

This invention describes apparatus for first converting two simultaneous amplitude modulated voltages corresponding to the voltage in and voltage out of a device or network under test into two square shaped waveforms whose relative widths are proportionate to the logarithm of the respective signal amplitudes and secondly providing an indication of the ratio thereof.

Background of the invention

This invention pertains to apparatus for obtaining the transfer function of both active and passive networks over a predetermined frequency range. Existing techniques for obtaining the transfer function normally fall into two categories: (1) the manual substitution of attenuators using point by point plots; and (2) the use of automatic sweep generators which purportedly maintain relatively flat power output over the desired frequency range. The displayed or plotted output of the testing at work is assumed to represent the desired characteristic or frequency response.

Inherent limitations exist with the two methods described however. The manual plotting-substitution method is laborious and wasteful of time, although this is the primary method currently used in testing microwave systems in the average laboratory due to the expensive automatic sweep generators. Automatic sweepers which have nominally flat signal response at their respective output terminals do not necessarily provide a constant signal at the input to the test network due to standing waves and losses in the connecting cable. Also, the network response display must use a quasi-logarithmic amplitude element to provide a decibel scale. Such logarithmic elements, accordingly, may be inaccurate by a factor of as much as 20%.

The problems incurred in the plotting broad-band antenna patterns are particularly well known because of the difficulty in obtaining a broad-band sweep generator having adequate RF energy to operate over the desired frequency range of the antenna. Furthermore, due to the long time intervals inherent in pattern measurement, signal generator power level changes are a significant factor in producing error and are at best an inconvenience. Finally, the testing of broad-band antennas involves numerous pattern plots and manual analysis which is time-consuming.

With respect to the prior art, apparatus is known for determining the transfer function of an electrical system. For example, U.S. Patent No. 3,206,672 issued to G. G. Gouriet et al. discloses apparatus for determining the transfer function of a four terminal linear electrical system. Also, U.S. Patent No. 3,177,347 issued to P. E. A. Cowley discloses a method and apparatus for determining the dynamic response of a system or process. Furthermore, inasmuch as the present invention is related to apparatus which operates on the principle of the exponential decay of the charge on a capacitor, attention is directed to U.S. Patent No. 2,647,236 issued to J. L. Saunderson et al. Also, U.S. Patent No. 3,161,766 issued to the present inventor discloses a voltage ratio to time difference translator which operates on the logarithmic discharge on two capacitors for providing a time difference which is a function of input ratio.

Summary of the invention

The present invention is directed to an improved means for determining the frequency response of a network under test which is coupled to a signal source such as a signal generator and which comprises a reference channel commonly coupled to the output of the signal generator and input to the network, and a variable channel which is coupled to the output of the network. Both channels are comprised of similar circuit elements including a voltage operated switch such as a chopper, an integrator circuit having an integrating capacitor, and a Schmitt trigger circuit. Additionally, a third Schmitt trigger circuit is coupled to both channels and is operative to be in a first operating state until both inputs to the channels, when summed, exceed a predetermined threshold level at which time said third Schmitt Trigger circuit switches to a second operating state. The voltage operated switch in both channels are responsive to the second state of the third Schmitt trigger circuit to open circuit the inputs to the integrator circuits. The voltage across the integrator capacitor in both the reference channel and the variable channel then decays logarithmically until the respective Schmitt trigger coupled to the output falls below their predetermined trigger threshold level at which time the Schmitt trigger switches state. A subtractor circuit is coupled to the outputs of the Schmitt trigger circuits in the reference channel and the variable channel to provide an output waveform whose width is indicative of the relative amplitudes of the signals in the reference and variable channel. Additionally, pulse forming means are coupled to the respective outputs of both Schmitt trigger circuits coupled to the reference channel and the variable channel integrator circuits so that pulses are provided at the instant each of the two Schmitt triggers change state providing further time measurement indication of the relative amplitudes of the voltage into the test network and the voltage out of the test network.

Brief description of the drawings

FIGURE 1 is a block diagram illustrative of the preferred embodiment of the invention; and FIGURE 2 is a series of waveforms helpful in understanding the operation of the subject invention.

Description of the preferred embodiment

Referring to FIGURE 1, a variable frequency signal generator 10 having an output signal $V_{in}$ is applied to an electrical apparatus under test 12 which may be, for example, an antenna or other electrical network. The apparatus under test 12 provides an output signal $V_{out}$ in response to the input signal $V_{in}$. The input and output voltages $V_{in}$ and $V_{out}$ are respectively coupled to a reference channel and a variable channel. The reference channel is comprised of a variable attenuator 14, a detector amplifier 16, a voltage operated switch illustrated as a chopper 18, an integrator circuit 20, first or A Schmitt trigger circuit 22 and a pulse shaper network 24. All of the aforementioned elements comprising the attenuator 14 through to the pulse shaper 24 are coupled together in series to the signal generator 10 as well as the apparatus under test 12. The reference channel is responsive to the voltage $V_{in}$.

The variable channel is comprised of a second detector amplifier 17, chopper 19, integrator 21, a second or B Schmitt trigger circuit 23 and pulse shaper network 25. The circuit elements comprising the detector amplifier 17 through the pulse shaper 25 are connected in series to the output of the apparatus under test 12 and is responsive to the voltage $V_{out}$. The reference channel is substantially identical to the variable channel with the exception that the reference channel additionally includes the variable attenuator 14. The purpose of the attenuator 14 is to adjust the gain of the signal in the reference channel to a convenient level for comparison with the signal in the variable channel. This is desirable particularly where a large insertion loss exists in the apparatus under test 12, such as when the apparatus under tests comprises an antenna having a large propagation loss.

A third or "threshold" Schmitt trigger circuit 26 is coupled to the detector amplifiers 16 and 17 which are adapted to have similar electrical characteristics. The threshold Schmitt trigger circuit 26 additionally includes a summation network, not shown, for summing the inputs thereto from the amplifier 16 and 17 to cause the operating state to change from a first to a second state when the signal amplitude sum reaches a predetermined threshold level. The output of the threshold Schmitt trigger circuit 26 is coupled to the choppers 18 and 19 causing the choppers to open and close in response to the sum of the amplitude levels of $V'_{in}$ and $V'_{out}$.

A subtractor circuit is coupled to the A and B Schmitt trigger circuits 22 and 23, respectively, receiving inputs therefrom to provide an output whose width is indicative of the time difference between the switching of Schmitt triggers or $t_{in} - t_{out}$. The pulse shaper circuit 24 provides a pulses output indicative of the time $t_{in}$ while the pulse shaper circuit 25 provides a pulse output indicative of the time $t_{out}$.

The relationship of these outputs is best described when considering the waveforms illustrated in FIGURE 2. Waveform 30 is illustrative of the output $V'_{in}$ from the detector amplifier 16 which is fed into the threshold Schmitt trigger circuit 26. Waveform 32 is the corresponding output $V'_{out}$ from detector amplifier 17. The amplitude level 33 corresponds to the level at which the summation of the inputs $V'_{in}$ and $V'_{out}$ applied to the threshold Schmitt trigger circuit 26 reaches the threshold level for the circuit to switch states. The voltage $V_{in}$, illustrated as waveform 34, from the signal generator 10 and the voltage $V_{out}$, illustrated as waveform 36, from the apparatus under test 12 are respectively fed through the detector amplifiers 16 and 17 and the choppers 18 and 19 to the integrator circuits 20 and 21 until such time as the amplitudes of the waveforms 30 and 32 provide a summed input to the threshold Schmitt trigger circuit 26 equal to the level 33 at which time the threshold Schmitt trigger 26 circuit feeds a signal to the choppers 18 and 19, causing the circuits to open, thereby preventing any further signal increase to be fed to the integrators 20 and 21. Waveforms 34 and 36 additionally illustrate the output of the integrator circuits 20 and 21, respectively. The integrators contain a resistance-capacitor integrator circuit with the respective capacitors being charged by the inputs $V_{in}$ and $V_{out}$ until such time as the threshold of the threshold Schmitt trigger circuit 26 is exceeded and the choppers 18 and 19 open circuit the inputs to the integrators 20 and 21. The amplitudes of $V_{in}$ and $V_{out}$ cease to increase and begin to decay exponentially at a rate equal to $e^{-t/T}$ which is determined by the time constant $T$ of the R-C integrator circuits.

Also, illustrated along with the waveforms 34 and 36 is a threshold level 38 which is the triggering levels for both A and B Schmitt triggers 22 and 23. When the waveform 34 is at the output of the integrator circuit 20, it exceeds the threshhold level 38; Schmitt trigger A changes state, going from the baseline level up to a second level which level is maintained until the waveform 34 decays below the threshold level 38. The output of the A Schmitt trigger is denoted by waveform 39. Likewise, the B Schmitt trigger provides an output signal according to waveform 40. Coupling the waveforms, corresponding to the outputs of A and B Schmitt trigger circuits 39 and 40, respectively, into the subtractor circuit 28, provides a waveform output 42 which is indicative of the time $t_{in} - t_{out}$.

The time difference $t_{in} - t_{out}$ between the two waveforms 39 and 40 is proportional to the ratio $V_{in}/V_{out}$, as shown by the following mathematical analysis:

$$V_{in}Ee^{-t_{in}/T} \qquad (1)$$

$$V_{out}Ee^{-t_{out}/T} \qquad (2)$$

$$V_{in}/V_{out} \frac{e^{-t_{in}/T}}{e^{-t_{out}/T}} \qquad (3)$$

$$\log(V_{in}/V_{out}) t_{in} - t_{out} \qquad (4)$$

or $$t_{in} - t_{out} \log(V_{in}/V_{out}) \qquad (5)$$

From the foregoing equations, it is apparent that the time difference $t_{in} - t_{out}$ is independent of the absolute magnitude of the voltages $V_{in}$ and $V_{out}$ and only dependent on the ratio of $V_{in}$ and $V_{out}$. The outputs of the pulse shaper circuits 24 and 25 are shown, respectively, as pulses 44 and 46. Both outputs are illustrated as being produced in response to the trailing edge of the waveforms 39 and 40, respectively. The relationships noted above may also be described by the following equation:

$$t_{in} - t_{out} \frac{8.7}{T} (db_{in} - db_{out}) \qquad (6)$$

where $t_{in} - t_{out}$ represents the desired time difference and $(db_{in} - db_{out})$ represents the voltage ratio $V_{in}/V_{out}$ in decibels.

The output pulses from pulse shaper circuits 24 and 25 as illustrated in FIGURE 2 are another convenient means for displaying the required data in time difference form. They may be used in conjunction with an oscilloscope by using pulse 44 to trigger the sweep and pulse 46 to intensify the Z-axis. On the other hand, the waveforms 44 and 46 may be used to activate a helical-blade facsimile chart recorder or similar recorder, provided the time constant $T$ is selected to provide time difference values which are appropriate for the response speed of such recorders. Pulses 44 and 46 might also be used to start and stop digital counters to provide a direct reading output of the desired time difference.

I claim:
1. A system for determining the transfer function of an electrical apparatus, having an input and an output, over a predetermined range of frequencies in accordance with an input signal fed thereto from the output of a frequency signal generator, comprising in combination:
   circuit means coupling the input of said electrical apparatus to the output of said signal generator;
   a reference channel circuit commonly coupled to the input of said electrical apparatus and the output of said signal generator;
   a variable channel circuit coupled to the output of said electrical apparatus, said reference channel circuit and said variable channel circuit each comprising voltage controlled switch means, an integrator circuit including capacitor means connected to said voltage controlled switch means to be charged exponentially thereby when said controlled switch means is in a first state of operation and discharged exponentially when said controlled switch means is in a second state of operation, threshold circuit means coupled to said integrator circuit and being responsive to the amplitude of the signal across said capacitor means to provide an output signal having a first amplitude when a predetermined threshold level is exceeded and a second amplitude when said predetermined threshold level is not exceeded; and
   another threshold circuit means coupled to said reference channel circuit and said variable channel cir- cuit, being responsive to the summation of the signals on the input to and the output from said electrical apparatus and having a second predetermined threshold level which when exceeded applies a signal to said controlled switch means in both said reference channel and said variable channel for operating said switch means to open circuit the respective integrator circuit means thereby effecting a discharge of the respective capacitor means, whereby the time difference between the output signals of said threshold circuit means of the variable channel and the reference channel switching from one amplitude to another provides an indication of the transfer function of the electrical apparatus.

2. The system as defined in claim 1 and additionally comprises circuit means coupled to said threshold circuit means in both said reference channel and said variable channel for providing an output signal indicative of the difference between the state of charge of said capacitor means relative to the threshold level of the respective threshold circuit means.

3. The system as defined in claim 2 wherein said circuit means comprises a subtractor circuit coupled to said threshold circuit means in said reference channel and said variable channel.

4. The system as defined in claim 2 wherein said circuit means comprises a first and a second pulse producing circuit means respectively coupled to said threshold circuit means in both said reference channel and said variable channel.

5. The system as defined in claim 1 wherein said threshold circuit means in said reference channel and said variable channel comprises Schmitt trigger circuits both having substantially the same threshold levels.

6. The system as defined in claim 1 wherein said voltage controlled switch means comprises a chopper circuit.

7. The invention as defined by claim 1 wherein said another threshold circuit comprises a Schmitt trigger circuit.

8. The apparatus as defined in claim 1 wherein said reference channel and said variable channel circuits each additionally include amplifier means having substantially similar electrical characteristics coupled between said electrical apparatus and the respective voltage controlled switch means.

9. The apparatus as defined by claim 8 and wherein said reference channel circuit additionally includes a variable attenuator coupled between said signal generator and said amplifier means.

10. The apparatus as defined by claim 1 and additionally including a variable attenuator coupled in said reference channel between said signal generator and said voltage controlled switch means.

References Cited

UNITED STATES PATENTS

| | | | |
|---|---|---|---|
| 3,177,347 | 4/1965 | Cowley | 324—57 X |
| 3,206,672 | 9/1965 | Gouriet et al. | 324—57 |
| 3,281,673 | 10/1966 | Richardson | 324—57 X |

EDWARD E. KUBASIEWICZ, Primary Examiner

U.S. Cl. X.R.

324—68, 140